June 3, 1969        S. VAJNA        3,448,043
ION EXCHANGE PROCESS
Filed Feb. 9, 1965
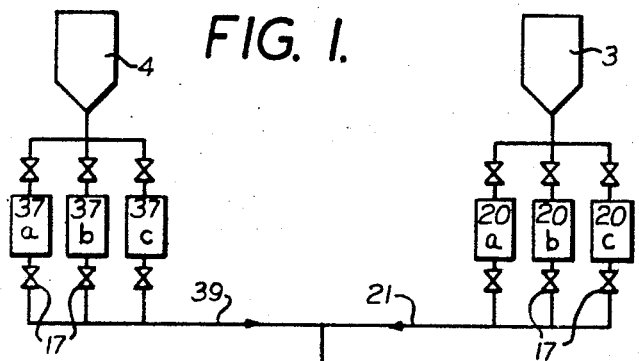
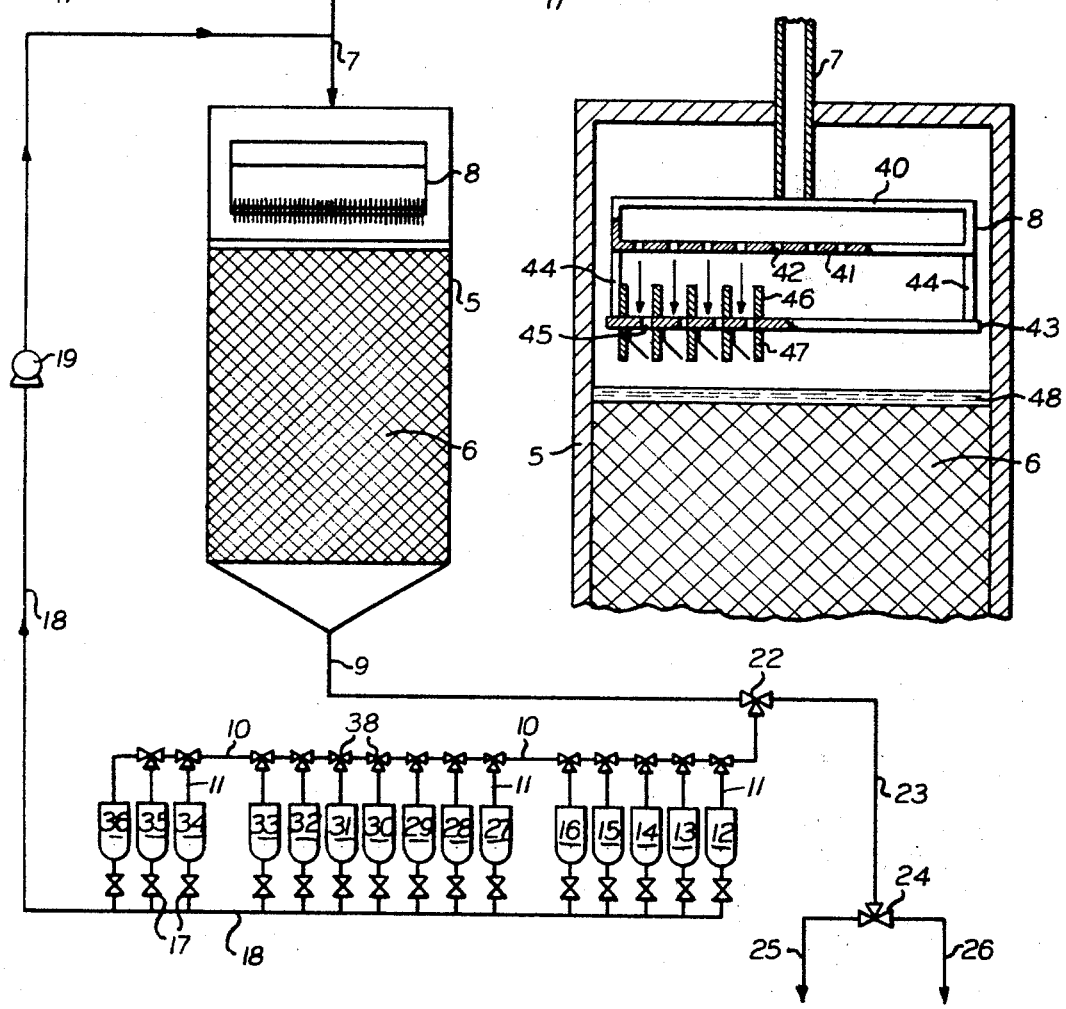
INVENTOR
SANDOR VAJNA
BY
ATTORNEYS.

United States Patent Office 3,448,043
Patented June 3, 1969

3,448,043
ION EXCHANGE PROCESS
Sandor Vajna, Rheinbreitbach, Germany, assignor to Dynamit Nobel Aktiengesellschaft Troisdorf, Bezirk Cologne, Germany, a corporation of Germany
Filed Feb. 9, 1965, Ser. No. 431,479
Claims priority, application Germany, Feb. 10, 1964,
V 25,359
Int. Cl. C02b 1/76, 1/42; B01d 15/06
U.S. Cl. 210—32     1 Claim

ABSTRACT OF THE DISCLOSURE

Ion exchange process in which series of liquid fractions are passed through a resin bed. The charging fractions vary in concentration to improve separation in the fractions displaced from the bed. Product solution is withdrawn when the concentration of the desired ion reaches its maximum. Other displacement fractions being collected separately to be subsequently used as charging fractions.

---

In the operation of ion exchange units, a cycle is employed wherein the input solution which is to be treated is passed through the bed whereupon the desired ion exchange takes place and the bed becomes depleted in its compensating ion, and then the bed is regenerated to remove therefrom the ion extracted from the input solution and replenish the bed with the compensating ion. The bed is then in condition suitable for treatment of further input solution. Commonly regeneration is effected by passing a suitable solution through the exchange material. In general, it is necessary to separate the treatment of the input solution and the regeneration, and vice versa, by flushing the bed with water. Thus, the entire cycle takes place in the following stages: starting with the bed filled with water and in regenerated condition, the water is displaced from the water-filled bed of regenerated exchange resin by the input solution; the ions of the input solution are replaced by the compensating ions of the exchange resin and the exchange resin is charged with the ions of the input solution; the input solution is then displaced by water; the water is displaced from the bed of exchange resin by the solution used for the regeneration; ions of the exchange resin and of the regeneration solution are exchanged; and then the regeneration solution is displaced by water.

Although the various liquids are charged completely separated from each other, they unavoidably mix with the liquid which is present in the bed of exchange resin. Accordingly, instead of sharp separation the liquids discharged upon changing over from input solution to regeneration solution and vice versa exhibit a mixed zone of continuously varying concentration and only after a certain amount of liquid has passed out does the concentration of the solution reach the concentration of the liquid charged.

The ion exchanges also take place in stepwise fashion. Generally, the fractions which are first to emerge are completely reacted, i.e., they contain only the ions coming from the exchange resin, but the subsequent fractions contain an increasing number of the ions of the solution charged; these fractions form the so-called reaction zone. When the exchange resin has been completely laden with the ions of the solution charged, the solution charged passes through unchanged. Thus, there is obtained a large quantity of liquid in which both ions are present simultaneously and in variable quantity.

Thus, upon each exchange, there is a front mixed zone and a rear mixed zone, as well as a reaction zone. As a result of the mixed zones, the solution removed is greatly diluted and as a result of the concentration gradient in the reaction zone, it is not possible at the same time to achieve the complete replacement of the ions of the solution by the ions of the exchange resin and complete replacement of the ions of the exchange resin by those of the solution.

In order to avoid the dilution of the withdrawn solution as a result of the rear mixing zone, it is known to store the fractions of this zone and to charge them again in the next cycle in the same sequence. In order to increase the extent to which the chemicals are utilized, fractions of the reaction zone have been stored—primarily in case of the regeneration of exchange resins—and used again in the same sequence upon the next exchange.

These measures, however, have not resulted in any substantial degree of success; nor was it possible to increase the effect under economically feasible conditions by increasing the number of fractions stored. This lack of success was caused—on basis of the findings of the present invention—by an undesired mixing of the fractions with each other as well as by a mixing within the individual fractions.

This mixing occurs as a result of the different densities of the solution fractions both upon the storing and upon the charging and is most intense in the dead spaces of the path of the solution. Thus the fractions of the front mixing zone are of increasing density. The fraction of lowest density is charged first and contacts the layer of liquid consisting of pure water which is located over the bed of exchange resin. The heavy liquid parts of the fraction move forward rapidly while the pure water remains at the top of the layer. This cycle repeats itself during the charging of the entire front mixing zone and as a result the fractions are mixed with each other so that the concentration gradient is flattened. The occurrence of the rear mixing zone is similarly injurious. The fractions of this zone are of decreasing density. After they are charged to the exchange resin bed, they are followed, however, by the freshly added solution, the density of which differs greatly from that of the most diluted last fractions of the mixed zone. The fresh solution therefore mixes with the stored thin fractions whereby it becomes contaminated by the compensated ions which are contained in said fractions. As a result of this, however, the equilibrium of the ion exchange is displaced in undesirable fashion. This varying concentration gradient is retained, however, also in the discharging solution so that an additional undesired mixing occurs in the stored fractions upon each charging, so that the effectiveness of the exchange is considerably reduced.

Thus, as a result of the undesired mixing, both the mixing zones and the reaction zone are increased in length; since the mixing increases with the number of fractions which are stored and charged again, the increasing of this number of the fractions also does not bring about any improvement.

Furthermore, mixing zones and reaction zones always occur simultaneously. Thus, as shown above, the injurious mixing as a result of the different densities of the fractions of the mixing zone exerts a detrimental effect on the reaction zone.

The lengthening of the two zones impairs the economy of the ion exchange process. The products are strongly diluted; the consumption of water is large; the useful capacity of an exchange resin is low; and the amount of regenerating agent required is large.

The object of the present invention is to prevent the above-described uncontrolled mixing within and between the individual zones by establishing its course in a manner different from that previously known and furthermore by the fact that instead of the uncontrolled mixing in the dead space above the bed of exchange resin, a controlled, reproducible mixing takes place.

In order to achieve this object, the method in accordance with the invention for the carrying out of the necessary method steps for ion exchange, of displacement of water by the solution, ion exchange, and displacement of the solution by water, in connection with which the effluents are subdivided into several fractions and a part of the fractions stored separately and conducted again, in the next cycle, successively in unchanged sequence over the exchange resin, is characterized by the fact that the various method steps are carried out separately. At first the displacement of the water is effected by fractions of a solution of ions which are identical with the exchange resin charge, and the concentration of which increases from zero up to the concentration at which the ion exchange is to take place. The displacement of this solution takes place with fractions of a solution, which contains as well as compensating ions, ions which are substantially identical to the exchange resin charge. The concentration of the first decreases substantially from the original concentration to substantially zero while the concentration of these compensating ions increases up to a concentration, which corresponds approximately to that of the ions to be compensated. This step is followed by several fractions of solutions, containing solely the compensating ions in a substantially constant concentration. This solution is displaced by another series of fractions with decreasing concentration of the compensating ion to substantially zero. The resin is afterwards rinsed with several fractions of pure water to remove the salt solution completely. In the second part of the complete cycle the operation is repeated using solutions of invert ions (i.e. compensated and compensating ions, the relationship of the concentrations being the opposite). The fractions introduced into the ion exchange vessel are uniformly distributed in known manner over the entire cross-section of the vessel in the form of a plurality of downward directed sharp jets. The kinetic energy of the jets is destroyed before impingement against a liquid layer of small depth located above the ion exchange bed. The liquid passes from this layer to the bed, and the fractions are intimately mixed, in the form of drops distributed uniformly over the entire cross-section of the vessel, with the upper layer of liquid of the bed.

A further improvement of the method consists of the fact that the splash or spray produced upon impingement on the baffle plate which serves to destroy the kinetic energy is intercepted and returned so that the entire quantity of liquid conducted by one jet remains the same. In this way, at the same time the mixing together of the jets is prevented and the distribution over the cross-section of the vessel is maintained. For this purpose, a sleeve for intercepting the spray is disposed about each jet.

Furthermore, the method of the invention contemplates preventing the liquid from flowing together below the baffle plate. For this purpose, a sleeve is positioned around each discharge opening of the plate so that the openings are separated from each other.

The invention is further described in reference to the accompanying drawing, wherein FIG. 1 is a schematic flow diagram for the process of the invention; and FIG. 2 is a cross-sectional view of a distributor according to the invention.

An ion exchange unit 5 contains a bed of ion exchange material 6, and is outfitted with inlet 7, distributor 8 and outlet 9. The outlet 9 is connected to the header 10 which is outfitted with offtake lines 11. The off-take lines communicate the header 10 via three-way valves 38 with the containers 12, 13, 14, 15 and 16. These containers are provided with outlets 17 which communicaate them with the collection header 18, and the collection header is connected via a pump 19 to the inlet line 7 for the exchange unit 5.

The system also includes two large containers 3 and 4 respectively equipped with a set of small containers 20a–c and 37a–c, to receive the rinsing water and the solution of the compensating ion respectively. This solution is the input solution to be treated in the ion exchange unit. The large containers 3 and 4 are communicaated with the inlet line 7 of the exchange unit by line 21 and by line 39 respectively.

The apparataus is further provided with a line 23 for receiving the output solution or the product. Line 23 is connected with the outlet 9 via a three-way valve 22. The line 26 is connected with line 23 via another three-way valve 24 and serves as an outlet for the discharge of product from the system. Line 25 is provided for the first runnings, consisting of rinsing water with a low salt contents.

The offtake lines communicate the header 10 with the other sets of containers 27, 28, 29, 30, 31, 32 and 33 respectively 34, 35 and 36. These containers are as well provided with outlets 17, which communicate them with the collection header 18, and the collection header is connected, as described above, to the inlet 7 for the exchange unit 5.

The first set of containers 12–16 is provided for the fractions with an increasing contents of the compensated ion. These containers have outlets 17 which communicate them with header 18, which in turn is communicated with the inlet line 7 of the exchange unit 5.

The second set of containers 27–33 is for the fractions with decreasing contents of the compensated ions and an increasing contents of the compensating ions, while the last set 34–36 is for the fractions with a decreasing contents of the compensating ions.

In the operation of the device, starting with the bed of ion exchange material 6 filled with water following regeneration of the exchange material, water displacement fractions from the containers 12, 13, 14, 15 and 16 are run successively through the exchange unit to effect the displacement of water in the desired manner. The displacement fractions contain in solution ions the same as the exchange resin charge (the same as the ions of the resin which, during ion exchange, are transferred to the input solution) and the concentration of these ions varies from a low value up to the ion concentration at which the ion exchange is to take place. The concentration in the first fraction passed through to effect the displacement is low, that in the next fraction is higher, etc. The initial concentration of the ion in the displacement liquor is to be about zero. The first runnings which contain the rinsing water with a very low salt contents are removed out of the system via line 23 and 25.

Following displacement of the water, as described above, flow from the first set of displacement containers is interrupted and solution is passed from the following set of containers 27–33 through line 7 and to the exchange unit 5. The effluent from the exchanger passes via the header 10 and line 23 and product can be withdrawn through line 26. During the course of the ion exchange, an input solution is used in which the concentration of the compensated ion, decreases, while the concentration of the compensaing ion gradually increases. These fractions are followed by several fractions of solutions conaining solely the compensating ion. If in the effluent stream from the exchange unit 5 the compensating ions appear the flow through product line 26 is interrupted and the effluent can be passed successively into the containers 27–33. These effluent fractions contain ions of both types. The concentration of the ion which is displaced from the solution (compensating ion) will increase from container 27 to container 28 to container 29, etc. The fractions collected in these containers are held thereby for treatment in a manner shortly to be described.

Following the filling of the last container of this set with a fraction of effluent containing both ions the flow through line 7 to the exchange unit 5 is interrupted. This step combines the product and the regeneration phase.

To complete the regeneration, the solution which fills the ion exchange material must first be displaced by water. To effect this the liquid contained in the solution displacement containers 34, 35 and 36 is passed successively into the exchange unit. This liquid has dissolved therein ions the same as the ions now held by the ion exchange resin compensating ions, and the concentration of these ions decreases going from container 34 to container 35 to container 36, from the original high concentration to substantially zero. The ion exchange material is then rinsed with several fractions of water. The effluent solutions can then be charged into the containers 34–36. At the conclusion of this charge, the ion exchange material is again completely filled with water. The procedure described above can then be carried through again with solutions of invert ions to complete the total cycle. In the first run of a next cycle the fractions collected in the containers 12–16, 27–33 and 34–36 can be passed again through the ion exchange material.

Details of the distributor 8 which is mounted in the exchange unit 5, are shown in FIG. 2. The distributor 8 is mounted in an air space over the ion exchange material 6. The distributor includes a container 40 disposed to receive input solution from the inlet line 7. The bottom 41 of the container is provided with uniformly distributed openings 42, the number and size of which is such that the same quantity of liquid flows through each of the openings. Below the container 40, is a baffle plate 43. This plate is secured to the container 40 by supports 44. This baffle plate is provided with openings 45, which are disposed in staggered relation with respect to the openings 42 in the bottom of the container 40, so that liquid jets issuing from the opening 42 in the container will not pass unimpeded through the openings 45 in the baffle 43.

Mounted on the baffle plate 43, in line with the openings 42 in the container 40, are the sleeves 46. The sleeves 46 are of a height such that they intercept any spray or splashing due to the striking of the jets issuing from the openings 42 in the container 40. Sleeves 47, aligned with the openings 45, are mounted on the lower side of the baffle plate 43. These sleeves extend downward to an extent that the liquid from the distributor will only pass or drip downward. Thus, good liquid distribution is provided while back mixing is prevented. If desired, the sleeves 46 and the sleeves 47 can be in the form of honeycomb structures above and below the baffle 43. The number 48 represents a liquid layer on top of the ion exchange bed.

The various conduits of the system shown in FIG. 1 are outfitted with valves to accommodate operation in the manner described. The valves can be control valves installed for automatic operation of the system. In the case of containers 12–16, 27–33 and 34–36 and the valves aociated therewith, each of the container can be provided with a float which is interconnected with the container inlet valve so that upon a predetermined level being reached in the container is reached, the inlet valve will be closed. The closing of the inlet valve to one container can provide the signal effective to open the inlet valve of the next container, and so on to effect the filling of the containers. The valves in the outlet lines from the containers 12–16, 27–33 and 34–36 can operate in a similar manner. Thus, each container can be provided with a float interconnected with its outlet valve so that upon the liquid falling to a predetermined level, the outlet valve will be closed. The closing of this outlet valve can provide a signal for the opening of the valve of the next container. In like manner provision can be made for the successive opening and closing of the various valves of the containers 12–16, 27–33 and 34–36.

Thus, the invention provides a method for ion exchange wherein, starting with a bed in charged condition and filled with water, the water is first displaced. The displacement of water from the bed is effected by passing plural displacement fractions successively through the bed. These fractions contain in solution ions substantially identical to the ions to be compensated with which the exchange resin is initially charged. The concentration of these ions in the fractions increases from about zero for the first fraction to the essential concentration in the last fraction. During the displacement, the discharge from the bed is collected in plural fractions to provide a first fraction of relatively low concentration and a last fraction of relatively high ion concentration.

The next solutions containing ions to be compensated and compensating ions are then passed through the bed for the ion exchange treatment. The first solutions are withdrawn from the bed, in which the ion concentration of the compensated ion is still gradually increased to the top limit for the product solution. At this point a series of effluent fractions are withdrawn, being the real product solutions. Afterwards the effluent fractions contain compensated ions and compensating ions, and the concentration of the compensated ions from the first fraction to the last fraction gradually decreases, while the concentration of the compensating ions from the first fraction to the last fraction gradually increases. The fractions withdrawn correspond with the input fractions but are temporarily shifted. Thereafter a series of equal fractions is introduced into the ion exchange bed containing solely the compensating ions and in such a concentration which corresponds to the total concentrations of the solutions of the last step.

After the last fraction of this series of described input fractions is introduced into the bed, the solution in the bed is displaced by passing plural fractions successively through the bed. These solution displacing fractions contain in solution ions practically identical with the ion charge then on the ion exchange bed, and the concentration of the ions in said solution displacing fractions decreases from a concentration in the first fraction about equal to the ion concentration at which the ion exchange took place to about zero in the last fraction. Discharge from the displacement by the plural fractions is collected in plural fractions including a first fraction of relatively high ion concentration and a last fraction of relatively low ion concentration. To finish the first part of the procedure the ion exchange bed is rinsed with several fractions of water. Regeneration can then be carried out in the described manner, using invert ions. Thereafter the step wherein water is displaced from the bed can be repeated, and so on.

The following specific example is intended to illustrate certain embodiments of this invention, but it is not intended that the invention be limited to the particular embodiments shown therein.

Example

The new method for ion exchange is described in the small scale experiment showing the following reaction:

(1) 
$$KCl_{solution} + NH_4[R] \rightarrow NH_4Cl_{solution} + K[R]$$

wherein [R] represents the cation exchange resin.

The above reaction is the first part of a cycle for the production of potassium carbonate. The second part of the complete cycle is represented by the following formula:

(2) 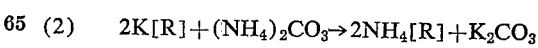
$$2K[R] + (NH_4)_2CO_3 \rightarrow 2NH_4[R] + K_2CO_3$$

An apparatus as previously described filled with a cation exchange resin was used, the reactor having a volume of 1500 ml. The total exchange capacity of the ion exchange resin amounted to 3500 mval. A poly-styrene sulphonic acid was used as cation exchange material. The first series included 20 fractions of $NH_4Cl$ solutions of 200 ml. volume each. The salt concentrations of these solutions increase from 0.25 to 3.6 N. Afterwards a second series comprising 25 fractions of 200 ml. volume each having a total concentration of 3.8 N was introduced in which the concentration of the NH₄ ions decreased continuously to zero while the concentrations of the K-ions increased. Thereafter four fractions of 200 ml. volume each of potassium chloride were introduced into the apparatus. The fractions had a concentration of K-ions amounting to 3.8 N. In a 3rd series containing 10 fractions of 200 ml. volume each and in which the concentration of the K-ions decreased from 3.8 to 0.1 N was introduced. At last the apparatus is washed with 4 fractions of 200 ml. of water. By rinsing 5 mval of KCl are washed out of the reactor. A total of 875 ml. of a KCl solution was taken from the storing container representing 3460 mval K-ions. The product consisted of 3.5 N of a chloride solution which contained 3.43 NH₄Cl (equal to 98% NH₄ ions). The ion exchange represents a yield of 99%.

What is claimed is:

1. Method for ion exchange starting with a charged ion exchange bed filled with water which comprises:
   (a) displacing the water by passing plural displacement fractions successively through the bed, said fractions containing in solution ions substantially identical to the ions with which the exchange resin is initially charged,
   the concentration of the ions in said fractions increasing from about zero for the first fraction to a concentration in the last fraction about equal to the ion concentration at which the ion exchange is to take place and collecting the discharge from the displacement in plural fractions beginning with fractions of relatively low ion concentration and last fractions of relatively high ion concentration; and thereafter,
   (b) successively passing a second series of fractions through the bed, said fractions containing compensated ions and compensating ions, the concentration of the compensating ions from the first fraction to the last fraction gradually increasing and the concentration of compensated ions from the first fraction to the last fraction gradually increasing and the concentration of compensated ions from the first fraction to the last fraction gradually decreasing,
   (c) withdrawing product solutions, when the concentration of the compensated ions has reached its maximum in the effluent fractions,
   (d) collecting the effluent fractions, when the concentration of the compensated ions decreases, while the concentration of the compensating ion increases,
   (e) after step (b) charging several fractions of the compensating ion into the bed having a concentration corresponding to the total concentration of the previous fractions containing the compensated ion and the compensating ion,
   (f) following step (e) charging several fractions with decreasing concentration of the compensating ion to zero into the bed,
   (g) rinsing the bed with several fractions of pure water after step (f),
   (h) collecting the effluent fractions of step (g) with decreasing concentrations of the compensating ion,
   (i) repeating the steps (a) to (h) using solutions containing invert ions,
   (j) conducting the complete cycle using as displacing fractions the effluent fractions collected in step (a), step (d) and step (h) in a previous cycle.

References Cited

UNITED STATES PATENTS

| | | | |
|---|---|---|---|
| 2,751,280 | 6/1956 | Hasselder | 210—38 X |
| 2,754,261 | 7/1956 | Akeroyd | 210—34 |
| 2,771,193 | 11/1956 | Simpson et al. | 210—32 X |
| 3,214,293 | 10/1965 | Mountfort | 210—32 X |

REUBEN FRIEDMAN, Primary Examiner.

C. M. DITLOW, Assistant Examiner.

U.S. Cl. X.R.

210—34, 38, 289, 456

PO-1050
(5/69)

UNITED STATES PATENT OFFICE
CERTIFICATE OF CORRECTION

Patent No. 3,448,043      Dated September 15, 1970

Inventor(s) Sandor Vajna

It is certified that error appears in the above-identified patent and that said Letters Patent are hereby corrected as shown below:

Col. 7, lines 37-39, cancel "and the concentration of compensated ions from the first fraction to the last fraction gradually increasing".

SIGNED AND
SEALED
NOV 17 1970

(SEAL)
Attest:

Edward M. Fletcher, Jr.
Attesting Officer

WILLIAM E. SCHUYLER, JR.
Commissioner of Patents